May 25, 1965   E. C. WEBB   3,185,176
SEALING MEANS FOR VALVES
Filed June 20, 1962
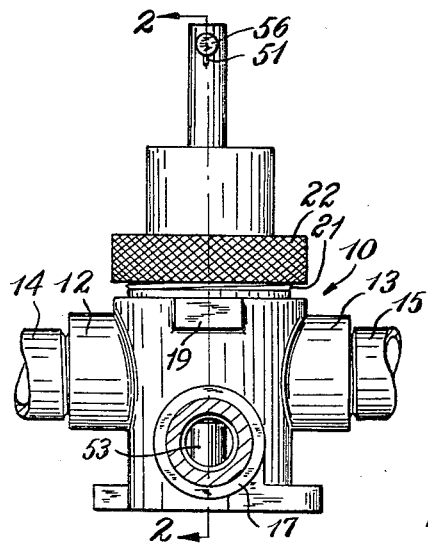
FIG. 1
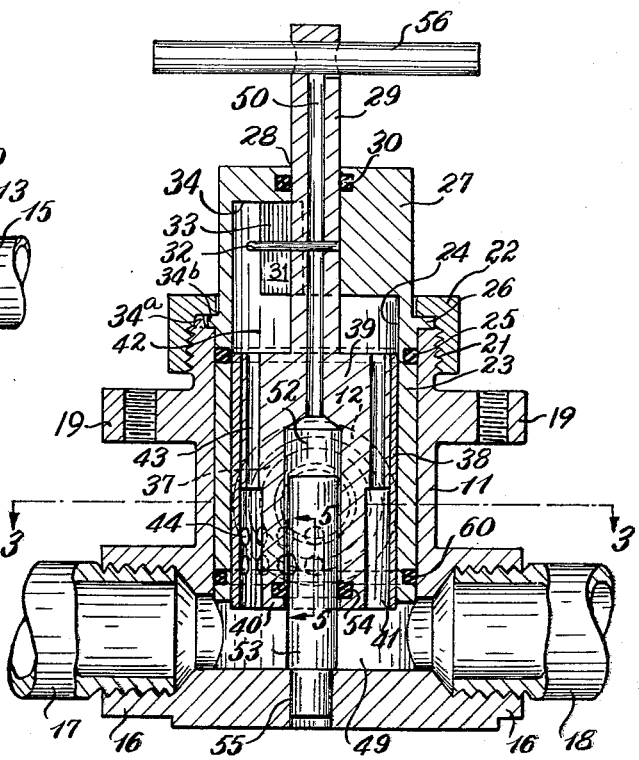
FIG. 2
FIG. 5
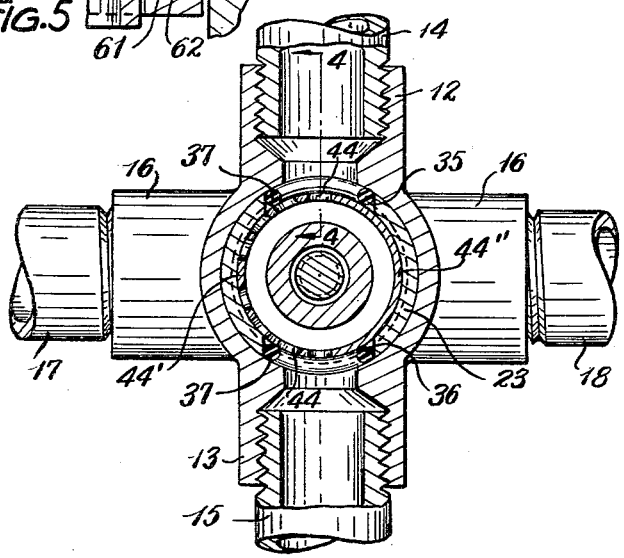
FIG. 3
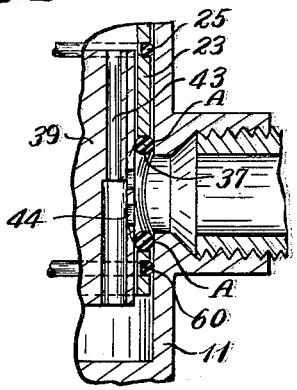
FIG. 4
INVENTOR.
ERNEST C. WEBB
BY
ATTORNEY 3,185,176
SEALING MEANS FOR VALVES
Ernest C. Webb, Cleveland, Ohio, assignor to Stephen C. Peplin, trustee, North Olmsted, Ohio
Filed June 20, 1962, Ser. No. 203,891
2 Claims. (Cl. 137—625.17)

This invention relates to sealing means disposed between valve elements and more particularly is an improved arrangement of seal rings in valves of the fluid mixing type to provide an effective seal against leakage when the valve is subjected to relatively high water inlet pressures such as that disclosed in the co-pending application of Frank H. Parker and Vernon C. Becks, Serial No. 165,900, filed January 12, 1962 and now assigned to Sephen C. Peplin, trustee.

It is an object of this invention to effectively improve the sealing qualities within a fluid pressure valve, particularly those of the fluid mixing type, which are subjected frequently to sudden and/or prolonged relatively high fluid inlet pressures and thereby to prevent leakage within the valve under both normal and high pressure conditions.

Another object of the invention is to eliminate the necessity of providing a high initial compression in the seal rings surrounding the valve inlets, thus reducing the operating force required to move the movable valve element in opening and closing the valve.

A further object is to maintain a maximum effective seal against leakage between the valve inlet ports and the mixing chamber, as well as exteriorly of the movable valve element, by causing fluid pressure to build up and exert its force against the seal ring surrounding each of the inlet ports.

A still further object is a construction of the type disclosed in which the sealing rings surrounding the inlet ports within the valve body are cause, under high fluid pressure, to exert an effective sealing force against the adjacent areas of the valve structure at a plurality of places around the circumference of the rings.

Other objects and advantages will become more apparent as the following description of an embodiment of the invention progresses, reference being made to the accompanying drawing in which like reference characters are employed to designate like parts throughout the same.

In the drawings:

FIGURE 1 is a side elevation of a fluid mixing valve within which the invention is incorporated;

FIGURE 2 is a vertical enlarged section taken on line 2—2 of FIGURE 1, illustrating my invention applied in use;

FIGURE 3 is a transverse section taken on the line 3—3 of FIGURE 2;

FIGURE 4 is a fragmentary vertical sectional view through a portion of the valve structure at and in the vicinity of one of the inlet ports; and FIGURE 5 is a fragmentary view, enlarged to a greater degree than that of FIGURE 4, to more clearly illustrate the invention in use.

The present invention is particularly useful and effective as a part of a fluid mixing valve construction of the type shown in the drawings in which the movable valve element is capable of moving along and about its axis to respectively control the volume of fluid flow and to regulate the proportions of fluids to be mixed such, for instance, as hot and cold fluids, or dissimilar fluids.

In the drawings, 10 denotes generally the valve bouy or housing having a cylindrical portion 11, a pair of oppositely disposed fluid inlet bosses 12 and 13 which may be connected to hot and cold water supply conduits 14 and 15, respectively, and a pair of outlet or discharge bosses 16, one having connection with a conduit 17 to deliver the mixed fluids to a faucet (not shown) while the other outlet may have connection with a conduit 18 to deliver mixed fluids to a shower head (not shown). Mounting lugs 19 are provided as a means for mounting the assembly on a wall or backing plate.

The cylindrical portion of the valve housing preferably projects upwardly and terminates in a threaded end 21 for receiving a threaded retaining cap 22. The cylindrical portion of the housing is open at its top end and is adapted to slidably receive an insert member comprising a cylindrical sleeve portion 23 extending into the housing cylinder and having an internal bore 24 within which a valve element is movable about and along its axis. An O-ring 25 is provided between the sleeve portion and the bore of the valve body. A circumferential flange 26 overlies the upper end of the housing 10 to limit the downward position of the insert 23 and when the cap 22 is screwed home, it will engage and removably lock the insert in position within the valve body, as clearly shown in FIG. 2. The upper portion of the insert 23 terminates in a head 27 having an axial opening 28 to slidably and rotatably receive a valve stem 29, there being provided in the portion 27 suitable sealing means surrounding the stem 29, such as an O-ring 30. The head portion is substantially solid in cross section with the exception of an open quadrant 31 opening to the inner wall 24. A stop pin 32 is carried by and extends radially from the valve stem 29 into the open quadrant and functions to limit rotative adjustment of the stem and valve member about its longitudinal axis by engaging one or the other of the walls 33 defining the quadrant and to limit longitudinal axial movement of the stem and valve member along the said axis of the stem in upward direction by engaging the wall 34.

The sleeve portion 23 of the insert member is so disposed within the bore of the valve body and maintained in such position by suitable means, such as an interfitting lug 34ª and notch 34ᵇ, as to axially align the fluid inlet openings 12 and 13 with the sealing ring receiving and retaining openings 35 and 36, respectively, formed in the sleeve 23. The openings 35 and 36 are sufficiently greater in diameter than those of the inlet openings to receive sealing rings, such as the O-rings 37 and to retain these seals in pressure sealing contact not only with the bore of the cylinder 11 but also with the walls of the openings 35 and 36, and with the outer cylindrical surface of the jacket 38 which preferably is press fitted to the movable valve element 39. The valve element 39 and the valve stem are preferably integral and may be formed of brass or other suitable material while the jacket 38 may be made of stainless steel to assure better wearing qualities between it and the bore of the sleeve 23.

The valve element 39 has substantial radial clearance with the sleeve or guide member bore 24 to permit smooth movement therein. This is illustrated at 39′ in FIGURE 5. The O-rings 37 seated within the inlet openings 35 and 36 will, of course, bridge this relatively small radial clearance in the area around the fluid inlets, and the valve element being guided and supported by its stem 29 and a stud 53, as illustrated in FIGURE 2, will be maintained with sufficient over-all radial clearance in the bore 24 under uneven lateral or torsional forces imposed during movement of the valve element. Thus, roughening or scoring of the outer surface of the valve by contact with the wall of the sleeve bore which, if present, would accelerate wear on the sealing rings, is eliminated. These rings also help to support and maintain axial alignment of the valve element within the valve body and sealingly engage the valve element.

The outside diameter of the O-rings 37 is slightly greater than the inside diameter of the openings 35 and 36. These rings are flexed or bowed as they are inserted into these openings, thus exerting a uniform pressure both circumferentially and radially outwardly of the rings and against the walls of the openings 35 and 36, the bore surface 24 adjacent to and surrounding the fluid inlet openings and the outer surface of the jacket 38 when the parts are all assembled together, as shown. Furthermore, under the influence of fluid pressure in the inlet openings 12 and 13 against these O-rings, the uniform sealing pressure will be further augmented.

The valve element 39 has a depending cylindrical skirt 40 which at 41 is spaced from and is concentric with the jacket 38. This skirt is also coextensive with the lower end of the jacket and the space 41 provides a mixing chamber for the fluids entering this chamber through a series of grouped ports formed in the jacket, as will presently appear.

The mixing chamber 41 communicates with the space 42 above the upper portion of the valve element 39 within the cylindrical sleeve 23, by means of openings 43.

The jacket 38 is provided with groups of small ports in its lower wall, each group consisting of a series of openings 44, the lower wall comprising two porting areas circumferentially arranged and separated by a relatively smaller valve arc 44′ and a relatively larger valve arc 44″, as indicated in FIG. 3. Each porting area consists of a plurality of series of ports arranged circumferentially and spaced apart axially of the jacket, as clearly illustrated in FIGURE 2.

The relative position of these porting areas in relation to the respective inlet openings 12 and 13 as determined by an application to the valve element 39 of an axial movement along, and/or rotative movement about, the longitudinal axis of the valve element and its stem, will respectively select the volume of flow from the inlets into the mixing chamber and the proportions of fluids entering the mixing chamber from the inlets. The space 41 within the valve element opens downwardly and is in communication with the lower end of the sleeve 23 and the chamber 49 depending upon the axial position of the valve element.

The valve stem 29 may be provided with a central axial passageway 50 which communicates with the outside atmosphere through a transverse passage 51 at its upper end and which, at its lower end, communicates with a larger coaxial bore 52 within which the stud 53 is telescoped for relative movement, there being a sealing ring 54 disposed between the stud and the skirt of the valve element to seal off passage of fluid from the mixing chamber into the bore 52. The stud may be press fitted at its lower end into an opening in the valve housing, as indicated at 55, but, as an alternative construction, the stud or its equivalent may be permanently fixed in the valve element to move therewith, in which event, its lower end would be slidably carried in the opening 55 and sealed against leakage through this opening. With such an alternative construction, it will be unnecessary to provide a vented valve stem.

Should leakage occur around the O-ring 54 and into the bore 52, it will show up at 51 by water emerging from the valve stem. In the alternative construction referred to above, leakage around an O-ring in the opening 55 in the base of the valve body will be a signal for replacement of the O-ring at that point.

Since the areas above and below the valve element are equal, the valve will be balanced when fluid is flowing through the valve.

A suitable handle 56 may be associated with the upper end of the valve stem for operating the valve.

The valve herein illustrated and described operates substantially the same as that disclosed in the pending application hereinabove referred to but the invention herein constitutes an improvement over the former valve disclosure in that it provides means for more effectively sealing against leakage of fluids through the valves not only at the normal pressure, but even at relatively high fluid pressures imposed upon the sealing rings surrounding the fluid inlet ports of the valve body.

For instance, under high fluid pressures there has in the past been a tendency for fluid leakage past the O-rings 37, this leakage traveling between the bore of the sleeve 23 and the outer surface of the valve element operating therein to finally enter the chamber 49. Leakage heretofore would travel along the space 39′, as indicated in FIGURE 5, and in some instances between the bore of the valve body and the adjacent cylindrical surface of the sleeve 23. However, in the previous constructions, the O-rings 37 would effectively seal against low or moderate water pressures provided, of course, if there were enough initial compression of the ring in sizing the outside diameter of the piston or valve element in relation to the thickness of the ring and the internal diameter of the annular cylindrical wall of the valve body. This invention recognizes that there is a disadvantage in providing a high initial compression of the material of the O-rings 37 since, under such circumstances, it would require a greater force to move the valve element when opening or closing the valve. In order to accomplish the purposes of the present invention, I provide a seal ring 60 such as an O-ring, which is disposed between the cylindrical portion 11 of the valve body and the sleeve 23. This is clearly shown in FIGURE 5. The O-ring 60 can be carried either by the sleeve 23 or it may be carried by the cylindrical portion 11 of the valve body. However, the preferred manner of carrying the sealing ring 60, as illustrated in FIGURE 5, consists in forming an annular groove 61 in the lower portion of the sleeve 23 and disposed below the lowermost portion of the openings 35 and 36 formed in the sleeve 23 and which support the O-rings 37 therein opposite the inlet ports. The annular groove 61 in cross section defines a pair of spaced apart substantially annular walls 62 and a back-up wall 63 connecting the walls 62, the walls 62 providing between them an opening within which to receive the O-ring 60. The O-rings 60 and 25 constitute static seals below and above the inlet ports, respectively. Consequently the O-rings 37 can be used with low initial compression since any water leakage by the O-rings 37 at point A in FIGURE 4 will be stopped by the static seals 25 and 60, thus causing increased pressure to build up to exert its force against the inlet seal rings 37 to exert an effective sealing pressure at B, C and D against the outer surface of the movable valve element, the inner cylindrical bore of the valve 23 and against the transverse wall of the openings 35 and 36, as indicated in FIGURE 5.

Under such conditions, leakage in the valve will be substantially eliminated.

I claim:

1. In a hydraulically balanced mixing valve assembly including a valve body having an axial bore, a pair of fluid inlets communicating with the bore, an outlet passage in the body for the mixed fluids, a valve sleeve member in the bore closing one end thereof and having openings therein in register with the respective fluid inlets, a valve element slideable and rotatable along and about a single axis within said sleeve member, O-ring seals carried in the inlet openings of the sleeve member and surrounding the fluid inlets, and static seal means interposed and supported between the sleeve member and the bore of the valve body, the diameters of the O-ring seals with respect to their associated inlet openings of the sleeve member and the cross-sectional areas of the O-ring seals with respect to the thickness of the sleeve member being such that the seals will be subjected to a build-up of fluid pressure in response to the seal effected by said static seal means to effectively seal against fluid leakage between the outer peripheral surface of the valve element and the inlet openings in the sleeve.

2. The hydraulically balanced mixing valve of claim 1 wherein said static seal means is also of the O-ring type.

References Cited by the Examiner

UNITED STATES PATENTS 2,433,732 12/47 Brown.
3,000,393 9/61 Maynard _____ 251—317 XR
3,012,753 12/61 Crang _____ 251—172 XR

FOREIGN PATENTS 1,259,804 3/61 France.

MARTIN P. SCHWADRON, *Primary Examiner.*

ISADOR WEIL, M. CARY NELSON, *Examiners.*